(12) United States Patent
Grob et al.

(10) Patent No.: US 6,821,023 B2
(45) Date of Patent: Nov. 23, 2004

(54) FIBER-OPTICAL CONNECTOR SYSTEM

(75) Inventors: Thomas Grob, St. Gallen (CH); Igor Marjetic, Arnegg (CH); Heinz Züllig, Niederuzwil (CH)

(73) Assignee: Huber+Suhner AG (CH)

( * ) Notice: Subject to any disclaimer, the term of this patent is extended or adjusted under 35 U.S.C. 154(b) by 0 days.

(21) Appl. No.: 10/469,496

(22) PCT Filed: Feb. 26, 2002

(86) PCT No.: PCT/CH02/00112

§ 371 (c)(1),
(2), (4) Date: Aug. 29, 2003

(87) PCT Pub. No.: WO02/071122

PCT Pub. Date: Sep. 12, 2002

(65) Prior Publication Data

US 2004/0081406 A1 Apr. 29, 2004

(30) Foreign Application Priority Data

Mar. 1, 2001 (CH) .............................................. 410/01

(51) Int. Cl.[7] .................................................. G02B 6/38
(52) U.S. Cl. .............................. 385/73; 385/70; 385/75
(58) Field of Search ............................. 385/76, 92, 77, 385/78, 88, 94, 73

(56) References Cited

U.S. PATENT DOCUMENTS 4,673,242 A * 6/1987 Logan et al. .................. 385/84
5,268,982 A * 12/1993 Schaffer et al. ............... 385/86
5,348,487 A * 9/1994 Marazzi et al. ............. 439/138
5,379,362 A   1/1995 Kawamura
6,142,676 A * 11/2000 Lu ............................... 385/60
6,461,054 B1 * 10/2002 Iwase .......................... 385/73
6,527,451 B2 * 3/2003 Asada ......................... 385/58
6,688,780 B2 * 2/2004 Duran .......................... 385/76

FOREIGN PATENT DOCUMENTS

| EP | 0 570 652 | 11/1993 |
| EP | 0 613 030 | 8/1994 |
| GB | 2112173 | 7/1983 |
| WO | WO 00/16145 | 3/2000 |

* cited by examiner

*Primary Examiner*—Chandrika Prasad
(74) *Attorney, Agent, or Firm*—Webb Ziesenheim Logsdon Orkin & Hanson, P.C.

(57) ABSTRACT

A fiber-optical connector system, including a fiber-optical connector and a coupling into which the connector can be inserted to establish an optical connection. The connector has a housing that extends along an axis and into which an optical fiber is arranged with the axis projecting with one end from the face of the housing. Means exist to cover the end of the optical fiber and protect the end of the optical fiber from any effects from the exterior when the connector is not inserted and to release the end of the optical fiber projecting from the housing when the connector is inserted in the coupling. A protection device for the connector system may be derived by configuring the cover means with a first cover element that protects the end of the optical fiber in the axial direction.

20 Claims, 5 Drawing Sheets

FIBER-OPTICAL CONNECTOR SYSTEM

FIELD OF THE INVENTION

The present invention relates to the field of fiber optics and, more specifically, to a fiber-optical connector system.

DESCRIPTION OF THE PRIOR ART

In the case of fiber-optical connector systems, in which it is usual for two optical fibers to be releasably connected to each other by insertion of two connectors into a coupling from two sides, the end faces of the two fibers to be connected must be brought into contact in such a way that a transfer of the optical signals that is as free as possible from losses can take place between the two fibers. For this purpose, the ends of the optical fibers, which are often adhesively embedded in ferrules, enter from both sides into a guiding sleeve provided in the coupling (see for example FIG. 10 of EP-B1-0 570 652 or FIGS. 20 and 21 of WO-A1-00/16145). In order that this can take place, the ends of the optical fibers or ferrules must be freely accessible at the end of the insertion operation.

On the other hand, it is necessary to prevent the ends of the optical fibers from being soiled when the connectors are not inserted in the coupling. In principle, it is conceivable for this purpose to provide protective caps, which are pushed manually over the free ends of the connectors. In order to avoid incorrect operation, however, a change has taken place in favor of providing the connectors with covering means which open automatically when the connector is inserted into the coupling, and also close again automatically when the connector is pulled out of the coupling. In addition, the coupling means are set up in such a way that a light beam emerging from the free fiber ends is reliably covered and cannot cause any damage.

In WO-A1-00/16145 (ADC) there is a description of a fiber-optical connector system which comprises a connector and a coupling. The connector, in which the optical fiber guided in the interior may optionally be arranged with its end freely accessible (FIGS. 5, 9) or in a ferrule (FIGS. 10, 13), is equipped with a covering flap. The covering flap is mounted pivotably about a fixed pivot axis. It pivots on insertion of the connector into the coupling, when an actuating cam arranged in the coupling comes into engagement with a slotted guideway on the covering flap. The covering flap and its pivoting region are designed in such a way that, after pivoting up, an end portion of the optical fiber or of the ferrule enclosing it projects freely forward out of the connector housing and can enter a sleeve-like guiding part arranged in the coupling. However, this has the consequence that comparatively considerable space is required for accommodating the covering flap on that side toward which the covering flap pivots up. This also applies to a similar known solution with a fixed pivot axis, as disclosed in U.S. Pat. No. 5,379,362.

Another known solution. (EP-B1-0 570 652, Diamond S.A.) provides a covering flap which, when the connector is inserted into the coupling, in a first phase is pivoted up by about 90° and in a second, subsequent phase is pushed back rearward parallel to the pivot axis, in order to release completely the end of the ferrule projecting from the connector housing. Although the combined pivoting and pushing movement has the effect that the space requirement for the covering flap is less than in the case of the pure pivoting movement of WO-A1-00/16145, the combined movement represents a comparatively complicated sequence of movements, which requires high precision and is susceptible to malfunctions. In addition, here—as in the case of the solution according to WO-A1-00/16145—the covering flap can be inadvertently opened and remain open even when a connector is not inserted.

A further known solution for a covering or protecting mechanism operating automatically on insertion is described in GB-A-2,112,173 (Thomas and Betts Corp.). In the case of this fiber-optical connector, the fiber lies with its end in a guiding sleeve which projects forward from the connector housing and can be pushed back against the pressure of a spring (44 in FIG. 1 or 144 in FIG. 3), which at the front end has a bore for the fiber. Provided laterally on the outside of the guiding sleeve is a covering in the form of a flexible sheet-metal strip. In the non-inserted state, the covering projects with the front end over the bore in such a way that the bore is closed. When the connector is inserted into a coupling part, the covering is displaced against a spring action (rearward or transversely) in such a way that the bore in the guiding sleeve is released. A disadvantage of this solution is that the guiding sleeve is not protected against mechanical effects when a connector is not inserted. Furthermore, the laterally provided sheet-metal strip prevents the guiding sleeve from being used for centering the connection when the connector is inserted. A force oriented transversely to the direction of insertion is also exerted on the guiding sleeve when the covering is actuated, and can easily lead to malfunctions. In addition, this protective mechanism is not suitable for connectors in which a ceramic ferrule into which the fiber is adhesively embedded by the end is provided instead of the guiding sleeve.

SUMMARY OF THE INVENTION

It is therefore the object of the invention to provide a connector system which avoids the disadvantages of known systems and, in particular with a simple and space-saving construction of the covering mechanism, is distinguished by high functional reliability.

The object is achieved by the features of claim 1 in their entirety. The essence of the invention is to divide the covering means into a first covering element, which protects the end of the optical fiber in the axial direction and can be displaced transversely to the axis, and a second covering element, which protects the end of the optical fiber projecting from the housing in the radial direction and can be displaced rearward parallel to the axis, and which has a first passage for the end of the optical fiber, the first passage being able to be closed by the first covering element. The division has the effect of producing simplified movement sequences for the two covering elements. At the same time, the division permits a space-saving arrangement and separate optimization of the functions.

The covering mechanism becomes particularly compact if, according to a first preferred refinement of the invention, the first covering element is arranged displaceably on the second covering element, if the first covering element is formed as a shutter, which is mounted displaceably transversely to the axis in a guideway formed in the second covering element, if, outside the region of the first passage, the guideway bends around in an arc rearward in a direction lying parallel to the axis, and if, for opening and closing the shutter, the shutter is displaced with its rear end parallel to the axis.

The automatic closing of the shutter is preferably brought about by the shutter being biased in the closed direction by a spring element, preferably in the form of a compression spring.

A particularly simple and effective mechanism for opening the shutter is obtained if, according to another preferred refinement of the invention, the shutter is fastened by its rear end to a slide, which is mounted displaceably in the direction of the axis in the housing of the connector, and if engaging means by which the slide is displaced rearward when the connector is inserted into the coupling are provided on the coupling and on the slide. In this case, the engaging means preferably comprise two actuating cams arranged on the inner sides of the side walls of the coupling and also two hook-shaped drivers, which are arranged on the sides of the slide and come into engagement with the actuating cams when the connector is inserted into the coupling.

For reliable prevention of a disturbing reflection of light through the closed shutter back into the optical fiber, it is of advantage if, in the region of the first passage, the guideway runs slightly at an angle to the axis.

The covering mechanism of the invention can be realized particularly simply if the second covering element is formed as a flap-shaped cover, and the guideway for the shutter is formed between the cover and a holder which is provided with a second passage and is fitted into the cover.

For opening the second covering element, in the coupling there is preferably a stop against which the second covering element or the cover butts, and by which the second covering element or the cover is pushed back rearward, thereby releasing the end of the optical fiber, when the connector is inserted into the coupling.

For closing the second covering element, in the coupling and on the second covering element or the cover there are preferably latching means which latch the second covering element or the cover to the coupling when the connector is completely inserted into the coupling, and securely hold the second covering element or the cover in the coupling when the connector is pulled out of the coupling, until the relative displacement between the second covering element or the cover and the housing of the connector causes the end of the optical fiber to be covered again in the radial direction. The latching means preferably comprise a detent provided on the second covering element or cover and also a closure flap, the closure flap being pivotably arranged in the coupling by means of a pivot bearing lying transversely to the axis and closing the coupling when the connector is not inserted, and the closure flap being pivoted up and latching with its free end behind the detent by insertion of the connector into the coupling.

BRIEF DESCRIPTION OF THE DRAWINGS

The invention is to be explained in more detail below on the basis of exemplary embodiments in conjunction with the drawing, in which.

DESCRIPTION OF THE INVENTION

Figure 1:
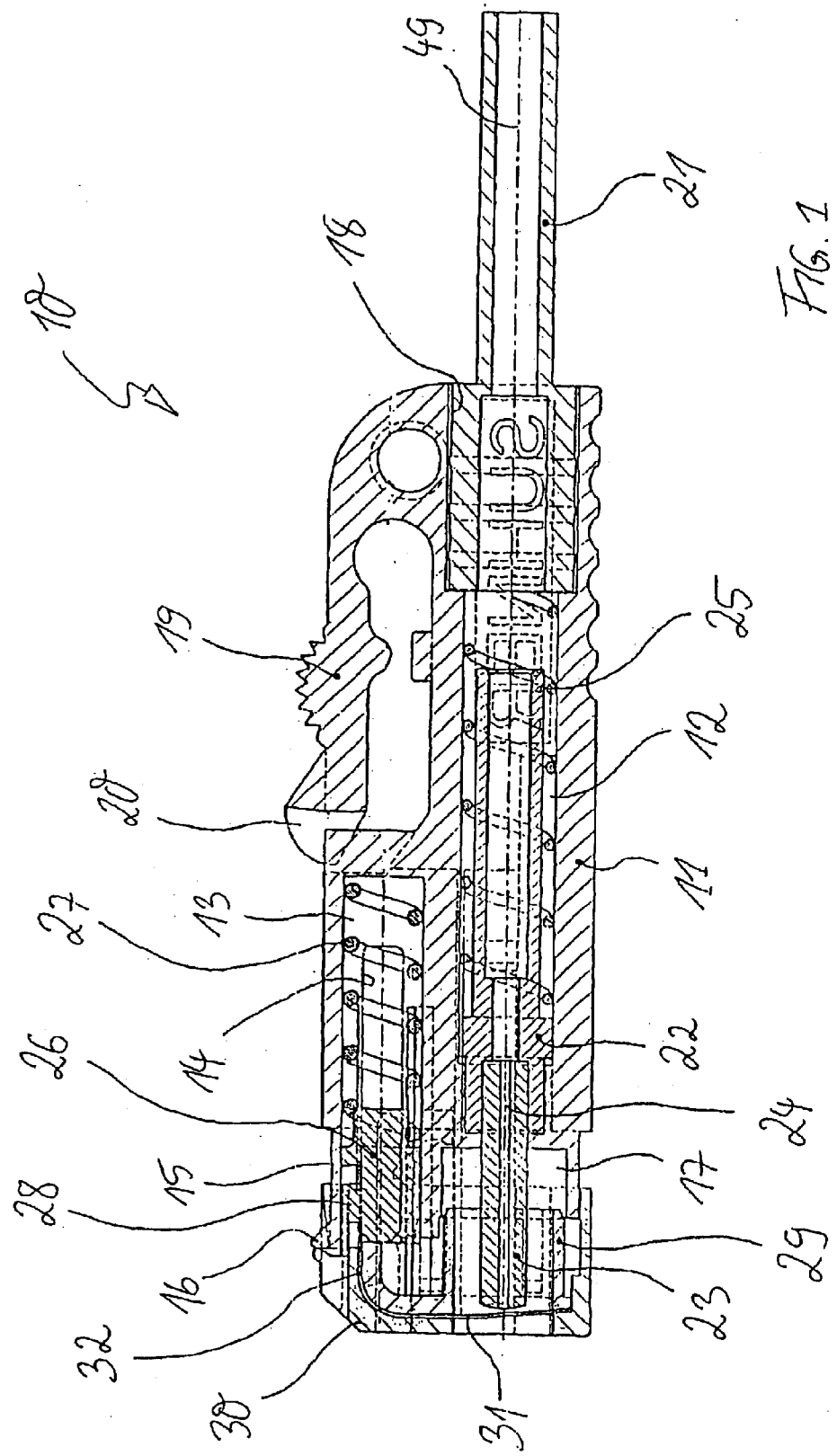
FIG. 1 shows a longitudinal section through a connector according to a preferred exemplary embodiment of the invention in the non-inserted state with the covering device closed.
Figure 2:
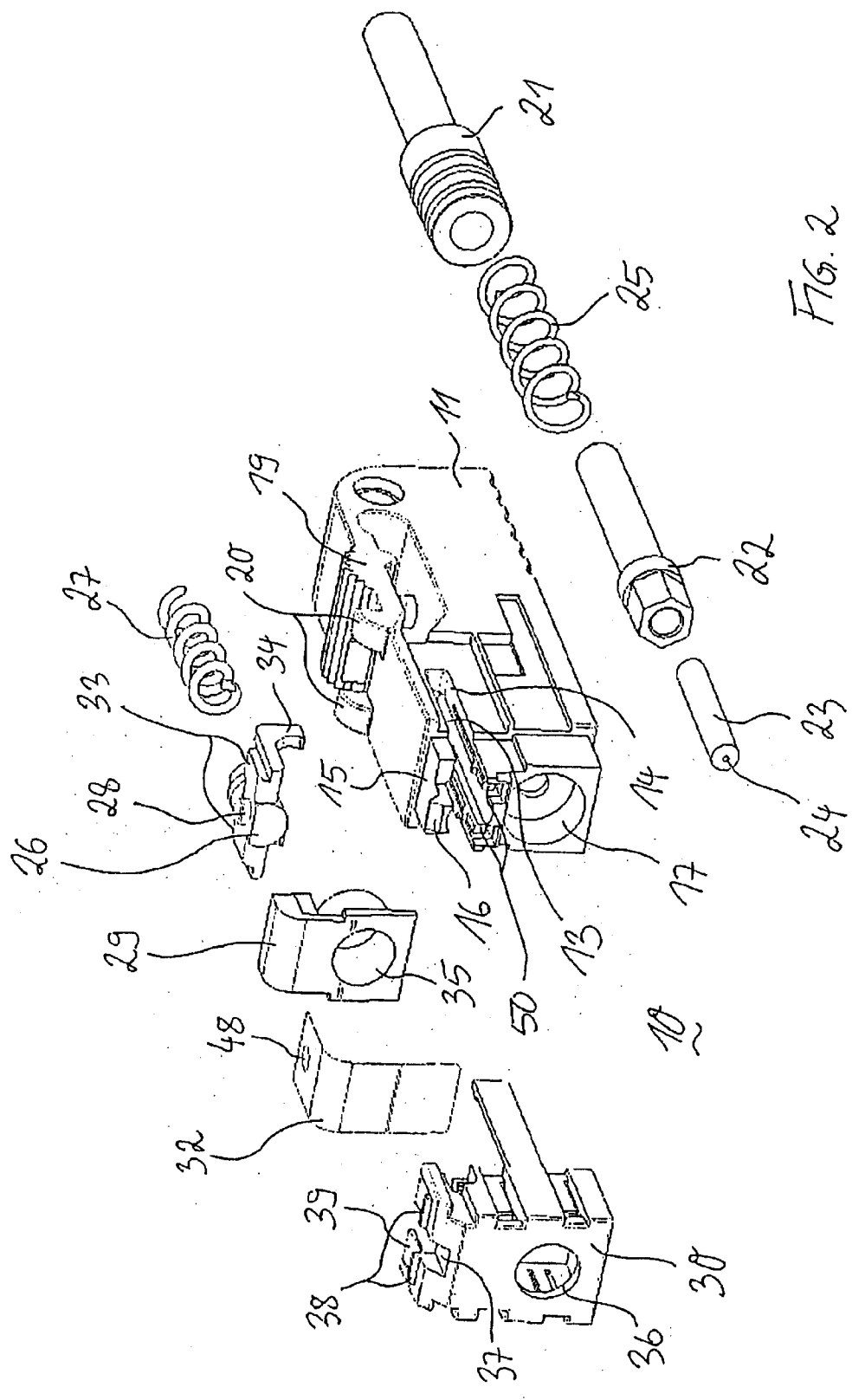
FIG. 2 shows in an exploded representation the individual parts of the connector according to FIG. 1.

FIG. 1 shows a longitudinal section through a connector according to a preferred exemplary embodiment of the invention in the non-inserted state with the covering device closed. The connector 10, the individual parts of which are also represented with the same reference numerals in FIG. 2, has an elongate housing 11, which is produced as an injection-molded part from a suitable plastic and extends in the direction of an axis 49. The axis 49 is at the same time the optical axis for the optical fiber (not shown in FIG. 1) and, in addition, indicates the direction of insertion in which the connector 10 is inserted.

Running coaxially in relation to the axis 49 through the housing 11 is a bore 12, which receives the optical cable or the optical fiber. At the front end (on the left in FIG. 1) and at the rear end (on the right in FIG. 1) of the connector 10, the bore 12 respectively goes over into a widened portion 17 and 18 with an enlarged inside diameter. Into the first widened portion 17 there projects a cylindrical ferrule 23, in the central bore 24 of which the end of the optical fiber is adhesively embedded in such a way that the end face of the fiber terminates with the convex end face of the ferrule 23.

The ferrule 36 is seated with the rear end in a ferrule holder 22, which is mounted displaceably in the direction of the axis 49 in the bore 12 and can be pushed rearward against the pressure of a first compression spring 25. Fitted into the second widened portion 18 is a spindle 21, the sleeve-shaped rear portion of which is used for fixing the optical cable and for pushing on an anti-kinking sleeve (comparable to FIG. 14 of WO-A1-00/16145). Also formed on at the rear end of the housing 11 is a forwardly extending, flexible latching arm 19, which serves for fixing the inserted connector 10 (see FIG. 3). The latching arm 19 has at its front free end two latching hooks 20, the function of which is discussed in more detail further below in conjunction with FIG. 3.

Provided at the front end of the connector, in the region of the ferrule 23, is a protecting and covering device, which substantially comprises two covering elements. The one covering element is a cap-shaped cover 30 with a central passage (36 in FIG. 2). The cover 30 is mounted displaceably in the direction of the axis 49 at the front end of the housing 11 and is pushed back rearward over the ferrule 23, thereby releasing the front end of the ferrule 23, when the connector 10 is inserted into the associated coupling (40 in FIG. 3).

The cover 30—when it is not pushed back—protects the ferrule 23 projecting from the widened portion 17 in the radial (lateral) direction. For the protection of the ferrule 23 in the axial direction (from the front), a shutter 32 (see also FIG. 2) is provided as the other covering element in the form of a rectangular, flexibly bendable sheet-metal strip, which is guided on the cover 30 in a guideway 31. The guideway 31 is formed by a holder 29 of an adapted shape, with a comparable passage (35 in FIG. 2) being fitted into the cover 30 from the rear, thereby maintaining a small distance which corresponds to the width of the guideway 31.

In the region of the first passage 36, the guideway 31 runs substantially perpendicularly to the axis 49. However, it deviates from the perpendicular to the extent that a reflection of light through the shutter 32 back into the optical fiber is reliably prevented. Outside the region of the first passage 36, the guideway 31 bends around in an arc rearward in a direction lying parallel to the axis 49. The shutter 32 guided in the guideway 31 is correspondingly bent. This achieves the effect that opening and closing of the shutter 32 is performed by displacing the rear end of the shutter 32 parallel to the axis 49.

The shutter 32 is fastened by the rear end to a slide 26, which is mounted displaceably in the axial direction in the upper part of the housing 11 in a slot-shaped clearance 13 and can be pushed back rearward against the pressure of a second compression spring 27. The slide 26 has on the upper side a holding cam 28, which reaches through a corresponding hole 48 in the shutter 32. Formed on two opposite sides of the slide 26 are flat arms 33, which project to the outside through lateral slots 14 in the housing 11. Formed on the outer ends of the arms 33 are hook-shaped drivers 34, which come into engagement with actuating cams (43 in FIG. 3), fixedly provided on the inner walls of the coupling 40, when the connector 10 is inserted into the coupling 40. The slide 26 is consequently pushed back relative to the housing 11 on insertion and the shutter 32, pulled back with the slide 26, releases the first passage 36. If the connector 10 is pulled out of the coupling 40 again, the compression spring 27 pushes the slide 26 back in the forward direction and the shutter 32 closes the first passage 36 again.

Figure 3:
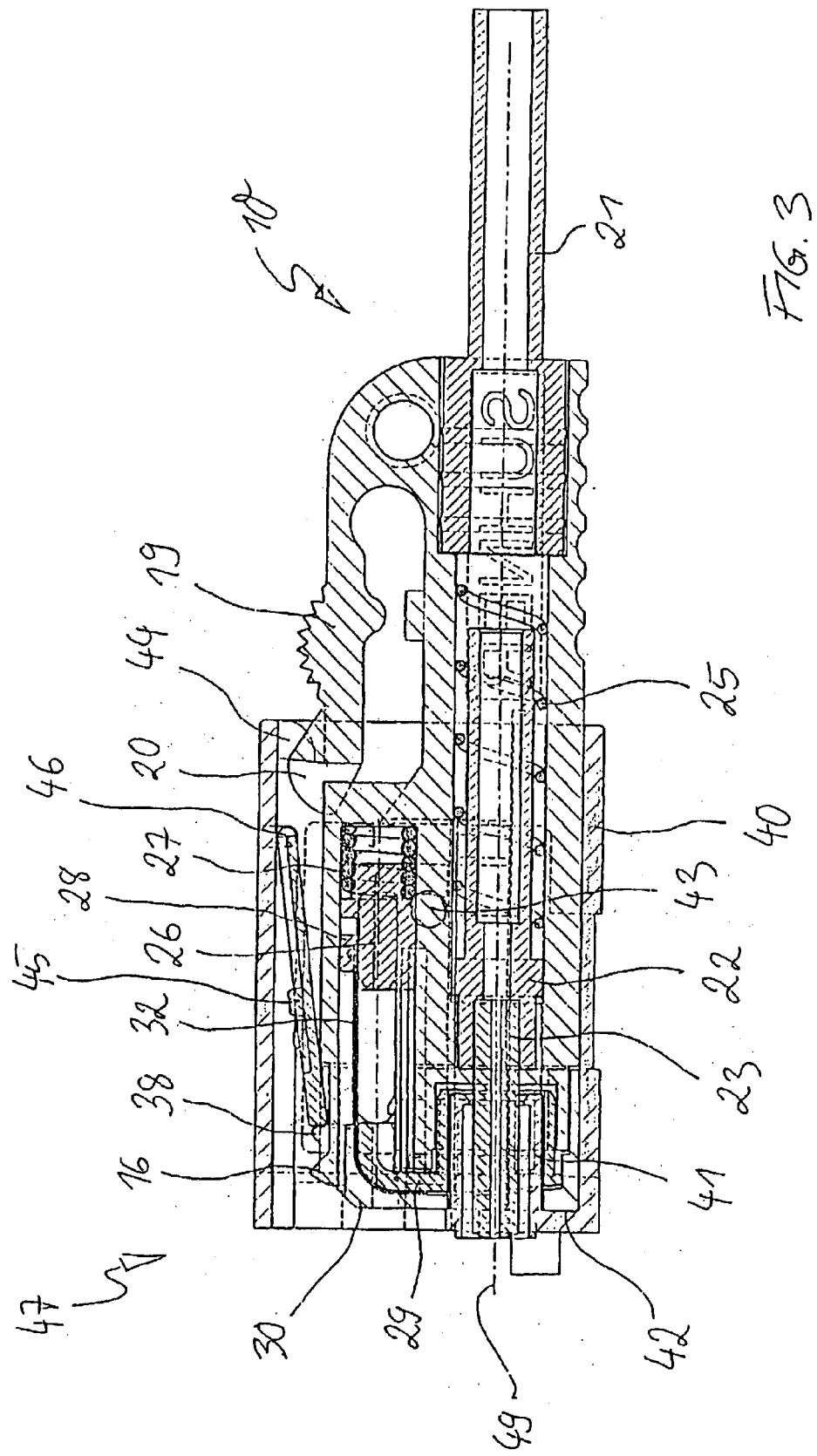
FIG. 3 shows in a representation comparable to FIG. 1 the connector from FIG. 1 inserted into the coupling, with the covering device opened.

The actuation of the cover 30, which—as explained further below on the basis of FIGS. 4 and 5—is performed in accordance with the actuation of the shutter 32, can be explained on the basis of FIG. 3, which shows a connector 10 completely inserted into the coupling 40. Of the coupling 40, only that part (the right-hand part) which is necessary for the connector 10 inserted from the right of the connector system 47 is represented in FIG. 3. For a second connector, inserted from the left, there is also a second, mirror-inverted (left-hand) part (see for example FIG. 21 of WO-A1-00/16145). The coupling 40 has in the center a bush mounting 41, which is coaxial to the axis 49 and into which a ceramic sleeve for guiding the ferrules of the two connectors can be inserted. The bush mounting 41 is held by a wall which is arranged perpendicularly in the centre and forms a stop 42 for the cover 30 of the inserted connector 10. If the connector 10 is then inserted into the coupling 40, firstly the lateral actuating cams 43 (depicted in FIG. 3 for clarification—although they are not visible) come into engagement with the drivers 34 of the slide 26. The slide 26 moves back in the clearance 13 and draws up the shutter 32 over the first passage 36. The cover 30 is in this phase hindered in a drawing-back movement by a locking mechanism described further below. Once the first passage 36 is free and the locking is unlocked, as it is inserted further the connector 10 butts with the cover 30 against the stop 42 of the coupling 40 and the cover 30 is pushed back, until the front end of the ferrule 32 is free, as shown in the representation in FIG. 3.

For the pushing forward of the cover from the pushed-back position shown in FIG. 3, a special latching mechanism, which is represented in FIG. 3, is provided. Belonging to this latching mechanism are two detents 38, arranged on the upper side of the cover 30, and a closure flap 45. The closure flap 45 is articulated pivotably in the interior of the coupling 40 by means of a pivot bearing 46 oriented transversely to the axis 49. When the connector 10 is inserted into the coupling 40, the closure flap 45 is pivoted up against the pressure of a spring and, after complete insertion of the connector 10, latches with the free edge, lying on a supporting surface 39, behind the detents 38 (FIG. 3). If the connector 10 is pulled out of the coupling 40 again, the latched closure flap 45 keeps the cover 30 fixed or back, until it is lifted over the detents 38 by an unlocking cam 16, which is formed on an attachment 15 of the housing 11 and slides back with the housing 11, and releases the cover 30. In order that the unlocking cam 16 can move freely in relation to the cover 30, a clearance 37 is provided between the detents 38.

For the locking of the inserted connector 10 in the coupling 40, the already mentioned flexible latching arm 19 is provided with the latching hooks 20, arranged at its free end. When the connector is inserted, the latching arm 19 latches with the latching hooks 20 behind two detents 44 formed on the inner edge of the coupling 40. For unlocking, the latching arm 19 must then be pressed down, until the latching hooks 20 come free from the detents 44.

Figure 4:
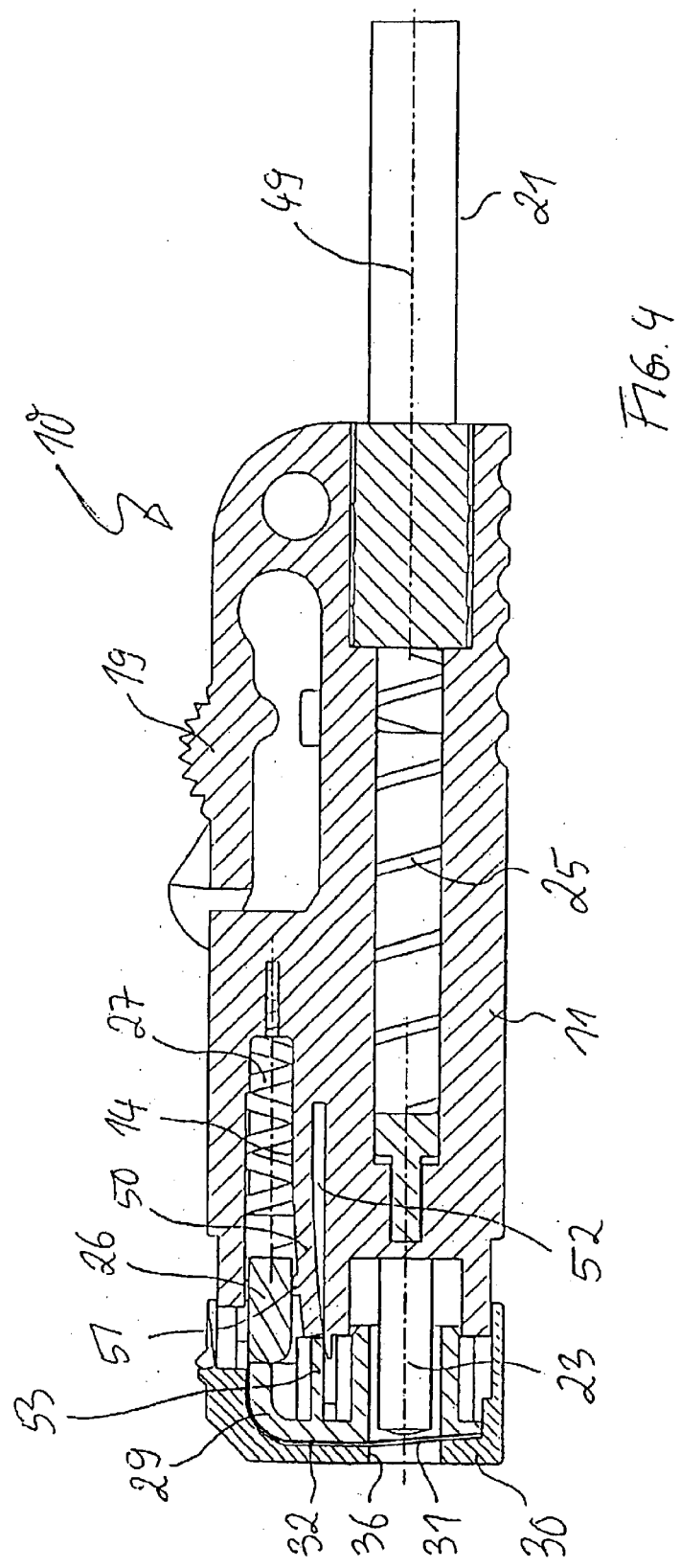
FIGS. 4 and 5 show in another sectional representation the function of the locking mechanism acting between the two covering elements of the covering device.
Figure 5:
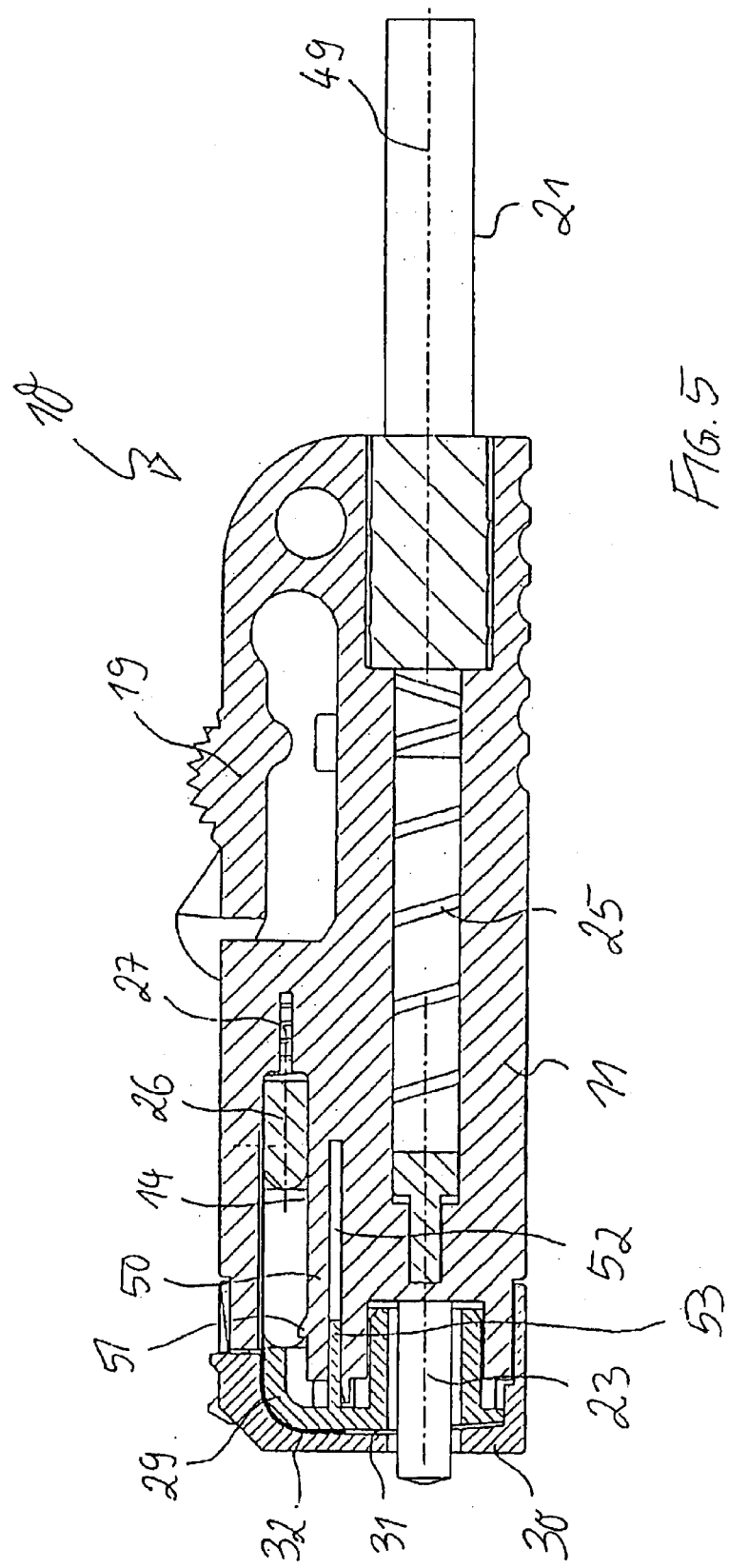

The already mentioned locking of the cover 30 by the slide 26 can best be explained on the basis of another sectional representation, as represented in FIGS. 4 and 5 for the locked and unlocked states. Essential elements of the locking mechanism are two locking levers 50 (FIGS. 2, 4 and 5), which are formed on the housing 11, extend parallel in the axial direction, can be deflected resiliently downward, are arranged on the lower inner edges of the slots 14 and respectively bear a cam 51 on the upper side. Left free underneath the locking levers 50 there is respectively a slot-shaped intermediate space 52, which, when the cover 30 is pushed back, can receive tongues 53 formed on the holder 29 and designed in such a way as to fit the intermediate space 52.

In the unplugged state of the connector 10, as represented in FIG. 4, the slide 26 is located with its arms 33 directly above the cams 51 of the locking levers 50. As a result, the locking levers 50 are deflected resiliently downward and prevent the tongues 53 of the holder 29 from entering the intermediate spaces 52 lying thereunder. The holder 29, and consequently also the cover 30, are thereby effectively prevented from yielding in this phase.

If, when the connector 10 is inserted, the slide 26 with the shutter 32 is pushed back in the way described further above to the extent that the passage 36 for the ferrule 23 is released, the cams 51 are released and the locking levers 50 can pivot back into their axially parallel position of rest. The intermediate spaces 52 lying thereunder are then released, so that the holder 29 can enter with its tongues 53 into the intermediate spaces 52 and the cover 30 can correspondingly move back and release the ferrule 23 (FIG. 5).

List of Designations

| | |
|---|---|
| 10 | connector |
| 11 | housing |
| 12 | bore |
| 13 | clearance (slot-shaped) |
| 14 | slot |
| 15 | attachment |
| 16 | unlocking cam |
| 17, 18 | widened portion |
| 19 | latching arm |
| 20 | latching hook |
| 21 | spindle |
| 22 | ferrule holder |
| 23 | ferrule |
| 24 | bore |
| 25, 27 | compression spring |
| 36 | slide |
| 20 | holding cam |
| 29 | holder |
| 30 | cover |
| 31 | guideway |
| 32 | shutter |
| 33 | arm |
| 34 | driver (hook-shaped) |
| 35, 36 | passage |
| 37 | clearance |
| 38, 44 | detent |
| 39 | supporting surface |
| 40 | coupling |
| 41 | bush mounting |

-continued

| 42 | stop |
| 43 | actuating cam |
| 45 | closure flap |
| 46 | pivot bearing |
| 47 | connector system |
| 48 | hole |
| 49 | axis |
| 50 | locking lever |
| 51 | cam |
| 52 | intermediate space (slot-shaped) |
| 53 | tongue (rigid) |

What is claimed is:

1. A fiber-optical connector system, comprising a fiber-optical connector and a coupling, into which the connector can be inserted to establish an optical connection, the connector having a housing extending along an axis, an optical fiber arranged in the housing, such that the optical fiber lies in the axis and projects with one end from an end face of the housing, and means being provided for covering the end of the optical fiber, wherein the means protect the end of the optical fiber against external effects when the connector is not inserted and release the end of the optical fiber projecting from the housing when the connector is inserted into the coupling, wherein the covering means comprise a first covering element, wherein the first covering element protects the end of the optical fiber in an axial direction and is displaced transversely to the axis, and wherein the covering means comprise a second covering element, wherein the second covering element protects the end of the optical fiber projecting from the housing in a radial direction and is displaced rearward parallel to the axis, the second covering element having a first passage for the end of the optical fiber, the first passage configured to be closed by the first covering element.

2. The connector system as claimed in claim 1, wherein the first covering element is arranged displaceably on the second covering element.

3. The connector system as claimed in claim 2, wherein the first covering element is formed as a shutter, wherein the shutter is mounted displaceably transversely to the axis in a guideway formed in the second covering element.

4. The connector system as claimed in claim 3, wherein, outside a region of the first passage, the guideway bends around in an arc rearward in a direction lying parallel to the axis, the shutter displaced with its rear end parallel to the axis.

5. The connector system as claimed in claim 4, wherein the shutter is biased in a closed direction by a spring element.

6. The connector system as claimed in claim 4, wherein the shutter having a rear end is fastened by the rear end to a slide, wherein the slide is mounted displaceably in the direction of the axis in the housing of the connector, and wherein engaging means are configured to displace the slide rearward when the connector is inserted into the coupling, the engaging means provided on the coupling and on the slide.

7. The connector system as claimed in claim 6, wherein the engaging means comprise two actuating cams arranged on inner sides of side walls of the coupling, the engaging means comprising two hook-shaped drivers, wherein the two hook-shaped drivers are arranged on sides of the slide and come into engagement with the two actuating cams when the connector is inserted into the coupling.

8. The connector system as claimed in claim 3, wherein a region of the first passage, the guideway is angled to the axis so that a reflection of light through the shutter back into the optical fiber is reliably prevented.

9. The connector system as claimed in claim 3, wherein the second covering element is formed as a flap-shaped cover, and the guideway for the shutter is formed between the cover and a holder, wherein the holder is provided with a second passage and is fitted into the cover.

10. The connector system as claimed in claim 1, wherein the coupling comprises a stop against which one of the second covering element and the cover abuts, and wherein one of the second covering element and the cover is pushed back rearward, whereby the end of the optical fiber is released when the connector is inserted into the coupling.

11. The connector system as claimed in claim 10, further comprising a locking mechanism, the locking mechanism allowing displacement of the second covering element when the first covering element has released the end of the optical fiber.

12. The connector system as claimed in claim 10, wherein the coupling is comprised of a latching means, one of the second covering element and the cover is comprised of the latching means, the latching means configured to latch one of the second covering element and the cover to the coupling when the connector is completely inserted into the coupling, the latching means securely holding one of the second covering element and the cover in the coupling when the connector is pulled out of the coupling, until the relative displacement between one of the second covering element and the cover and the housing of the connector causes the end of the optical fiber to be covered again in the radial direction.

13. The connector system as claimed in claim 12, wherein the latching means comprise a detent provided on one of the second covering element and cover and also a closure flap, the closure flap pivotally arranged in the coupling by a pivot bearing lying transversely to the axis and closing the coupling when the connector is not inserted, and the closure flap urged pivotally upward to latch with the free end behind the detent when the connector is inserted into the coupling.

14. The connector system as claimed in claim 5, wherein the shutter having a rear end is fastened by the rear end to a slide, wherein the slide is mounted displaceably in the direction of the axis in the housing of the connector, and wherein engaging means are configured to displace the slide rearward when the connector is inserted into the coupling, the engaging means provided on the coupling and on the slide.

15. The connector system as claimed in claim 14, wherein the engaging means comprise two actuating cams arranged on inner sides of side walls of the coupling, the engaging means comprising two hook-shaped drivers, wherein the two hook-shaped drivers are arranged on sides of the slide and come into engagement with the two actuating cams when the connector,is inserted into the coupling.

16. The connector system as claimed in claim 4, wherein a region of the first passage, the guideway is angled to the axis so that a reflection of light through the shutter back into the optical fiber is reliably prevented.

17. The connector system as claimed in claim 4, wherein the second covering element is formed as a flap-shaped cover, and the guideway for the shutter is formed between the cover and a holder, wherein the holder is provided with a second passage and is fitted into the cover.

18. The connector system as claimed in claim 2, wherein the coupling comprises a stop against which one of the second covering element and the cover abuts, and wherein one of the second covering element and the cover is pushed back rearward, whereby the end of the optical fiber is released when the connector is inserted into the coupling.

19. The connector system as claimed in claim 3, wherein the coupling comprises a stop against which one of the second covering element and the cover abuts, and wherein one of the second covering element and the cover is pushed back rearward, whereby the end of the optical fiber is released when the connector is inserted into the coupling.

20. The connector system as claimed in claim 4, wherein the coupling comprises a stop against which one of the second covering element and the cover abuts, and wherein one of the second covering element and the cover is pushed back rearward, whereby the end of the optical fiber is released when the connector is inserted into the coupling.

* * * * *